United States Patent [19]
Jauss

[11] 3,894,382
[45] July 15, 1975

[54] CORN HARVESTER

[76] Inventor: Paul Jauss, Oberdiller Str. 48, 8027 Baierbrumm, Germany

[22] Filed: Mar. 5, 1973

[21] Appl. No.: 338,326

[30] Foreign Application Priority Data
Mar. 6, 1972 Germany............................ 2210635

[52] U.S. Cl. ...................... 56/14.3; 56/14.5; 56/98; 56/119
[51] Int. Cl............................................ A01d 45/02
[58] Field of Search ............................. 56/94–100, 56/105–112, 119, 13.5, 13.9, 14.3, 60–62, 14.1, 14.3, 27.5, 14.5

[56] References Cited
UNITED STATES PATENTS

| | | | |
|---|---|---|---|
| 1,134,451 | 4/1915 | Grove | 56/119 |
| 2,480,209 | 8/1949 | Aasland | 56/119 X |
| 2,509,970 | 5/1950 | Edmonds | 56/27.5 X |
| 2,634,569 | 4/1953 | Raney et al. | 56/60 X |
| 2,728,184 | 12/1955 | Ferguson | 56/119 |
| 2,924,056 | 2/1960 | Morgan et al. | 56/119 X |
| 3,075,339 | 1/1963 | Barkstrom | 56/98 |
| 3,260,041 | 7/1966 | McRoberts et al. | 56/119 |
| 3,520,121 | 7/1970 | Ashton et al. | 56/14.1 X |
| 3,670,482 | 6/1972 | Blanshine et al. | 56/98 |
| 3,678,666 | 7/1972 | Holzmann | 56/119 |
| 3,736,734 | 6/1973 | Pavel | 56/119 |

*Primary Examiner*—Louis G. Mancene
*Assistant Examiner*—J. N. Eskovitz
*Attorney, Agent, or Firm*—Woodhams, Blanchard and Flynn

[57] ABSTRACT

A corn harvester for harvesting corn plants growing in rows. The harvester has at least one draw-in chain per row receiving means and has flanges which are mounted thereon in such numbers and at such close distance from one another on one side of the draw-in chain that during a straight draw of the draw-in chain, a corn stalk is compressed between two adjacent flanges and the draw-in chain describes an arcuate travel adjacent the front and rear of the harvester during catching and discharging of the corn stalk or ears of corn so that the space between two adjacent flanges becomes larger and thus makes room for the corn stalk to enter into and exit from the flange space.

27 Claims, 15 Drawing Figures

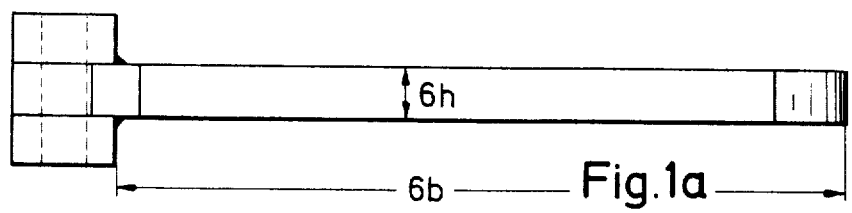
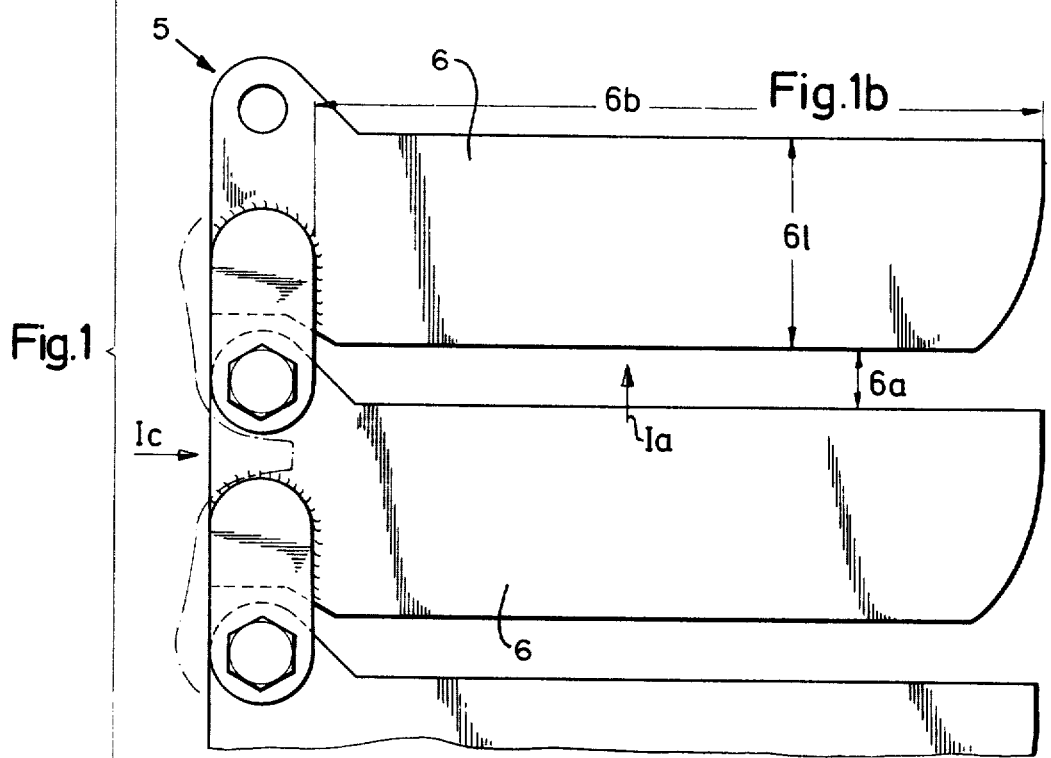
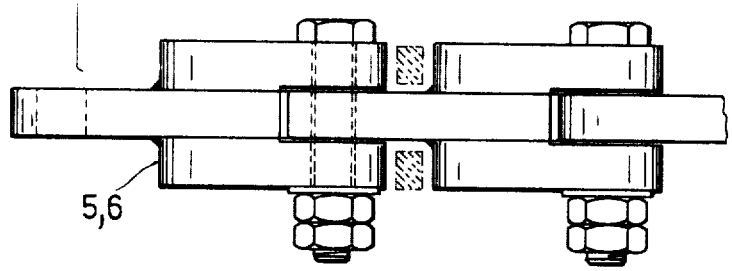

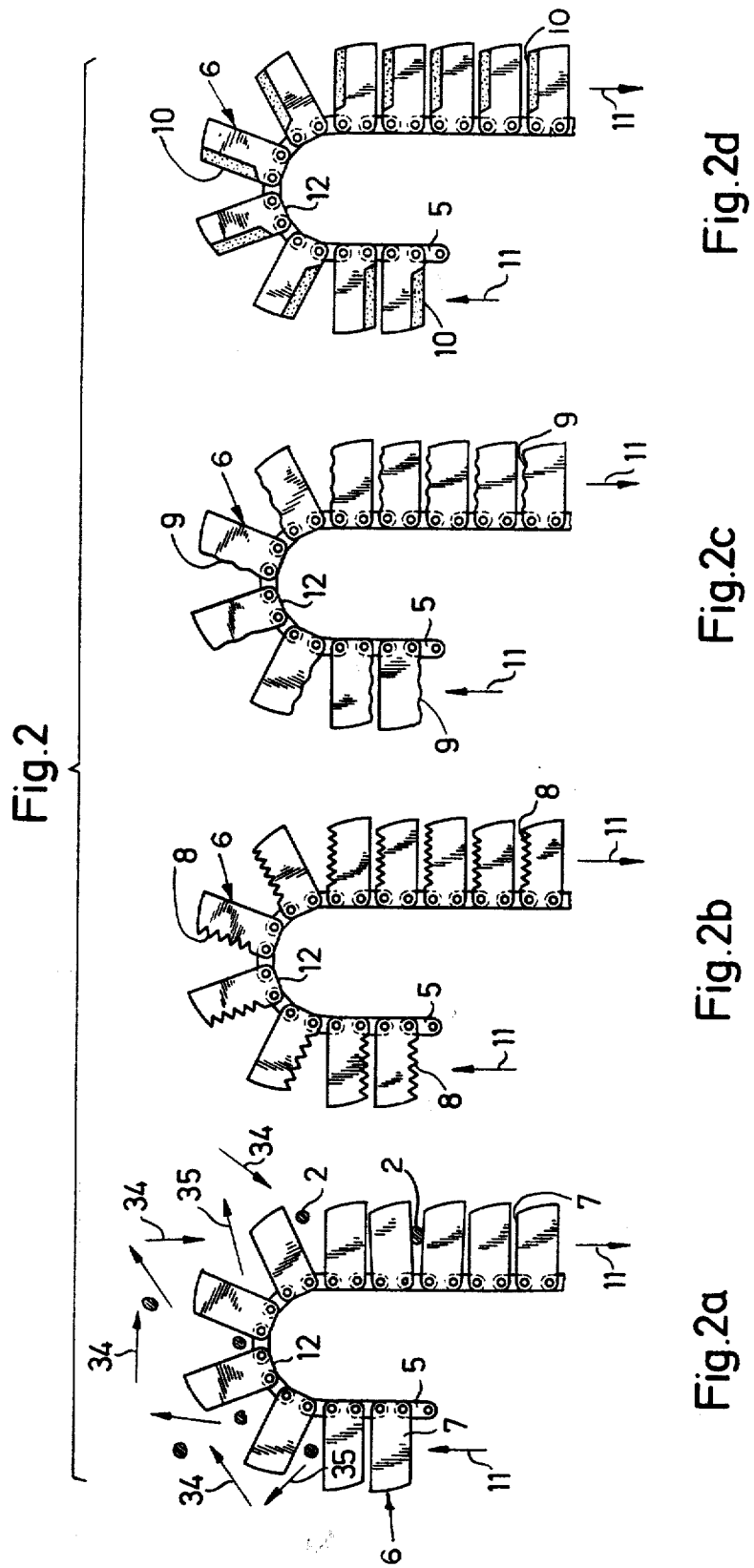

3,894,382

CORN HARVESTER

The invention relates to the construction and operation of a corn harvester which is used as an attachment for a corn harvesting machine (for example a field chaff cutter, combine, loading wagon) on farms to mow the plants which are planted in rows and grow above the ground or only to pick the ears of corn from the plant and to convey the drawn-in plant part into the processing corn harvesting machine.

In the known corn harvesters, two types exist: the mowing corn harvester and the ear-picking corn harvester; both in turn are fixed with respect to their number of rows if they have a center discharge zone or each attachment is separately installed (combine, for example). Most corn harvesters work with draw-in chains, for each row receiving means at least two draw-in chains are thereby required.

It is thereby necessary to have ready a plurality of corn harvester types in order to meet the requirements of the practice: Mowing or picking ones, with a central discharge zone one, two, three or four rowlike ones, in the case of many rows with various row distances, and moreover unnecessarily many draw-in elements are installed.

The purpose of the invention is to limit the draw-in and drive parts to a minimum and to unite the many corn harvester types possibly into one corn harvester and to thus produce a variable corn harvester system.

This purpose is attained according to the invention in such a manner that one draw-in chain is sufficient for the corn harvester, the flanges of which draw-in chain are mounted in such numbers and at such close distances from one another on one side on the draw-in chain, that during a straight draw of the draw-in chain a corn stalk is compressed by two adjacent flanges in such a manner that it can hardly move freely in running direction of the draw-in chain within the flange space, and the draw-in chain describes an arcuate travel during catching and discharging of the corn stalk or ear of corn, whereby the space between two adjacent flanges becomes clearly larger.

On the other hand, two adjacent flanges are not to clamp the corn stalk too strongly, so that with a similar draw-in chain construction the corn harvester can be used as picking attachment for ears of corn, whereby the corn stalks are pulled through the flange spaces by picking rollers or the like, whereby the ears remain on the flanges and are moved away by same. Thus there now exists also the possibility to construct the respective corn harvester as a combination corn harvester because it can do both mow corn plants and also pick ears of corn which, in the case of a corn harvester with many corn stalk receiving rows permits the possibility to pick at least one row and to mow others.

Advantageous is a picking base which consists of at least two picking rollers, whereby at least one is constructed as a cutting roller and is provided with at least five cutting edges. It would be practical to construct the picking base pivotable, switchable off and on and quickly attachable and detachable.

According to other characteristics of the invention the free ends of the draw-in chain flanges are guided by guide rails, or the conveyor path of the draw-in chain is constructed as a conveyor channel which has guide rails for the draw-in chain or/and its flanges and guiding plates for corn parts.

A further characteristic of the invention utilizes the draw-in chain, as a drive chain for the mower, which is constructed advantageously as a rotating mower blade and has the further advantage of receiving a rotatable counter blade which is to be driven by lateral contact from the other cutting blade.

Advantageous is the use of a roller chain as a draw-in chain. According to the invention, the draw-in chain is tensioned by creating a rigid connection between two sprocket wheels between which the conveyor channel exists, and a third movable sprocket wheel functions as a sprocket tensioning wheel, or the two sprocket wheels are connected by a telescopically expandable conveyor channel.

According to a further characteristic of the invention, the discharge zone of the draw-in chain or the corn harvester is provided with a fixed or/and rotating wiper which in turn can be connected to the driving or tensioning sprocket wheel. It is advisable to equip the conveyor channel with a removable bottom plate. According to a further characteristic of the invention, a center mounting block is provided on which the individual row receiving means (which are preferably capable of varying the space therebetween), are constructed side-by-side and one above the other; it is thereby suggested to make the receiving means adjustable or/and movable with connecting cover plates so that the corn harvester can be adjusted to the various plant row spacings.

The advantages achieved with the invention consist particularly in that, based on a simple operating structure, a very versatile, and thus adaptable, corn harvester system is created which requires little expense and, in addition, whose principle can be used almost in all situations of necessity.

Important characteristics of the invention are illustrated in the drawings and will be described hereinafter.

In the drawings:

FIG. 1 illustrates in detail an inventive draw-in chain, 1a from the rear, 1b from above, 1c from the right side.

FIG. 2 which includes FIGS. 2a, 2b and 2c, is a top view of half of a draw-in chain having various flange constructions and various receiving and discharge directions for the harvested goods.

Figure 6:
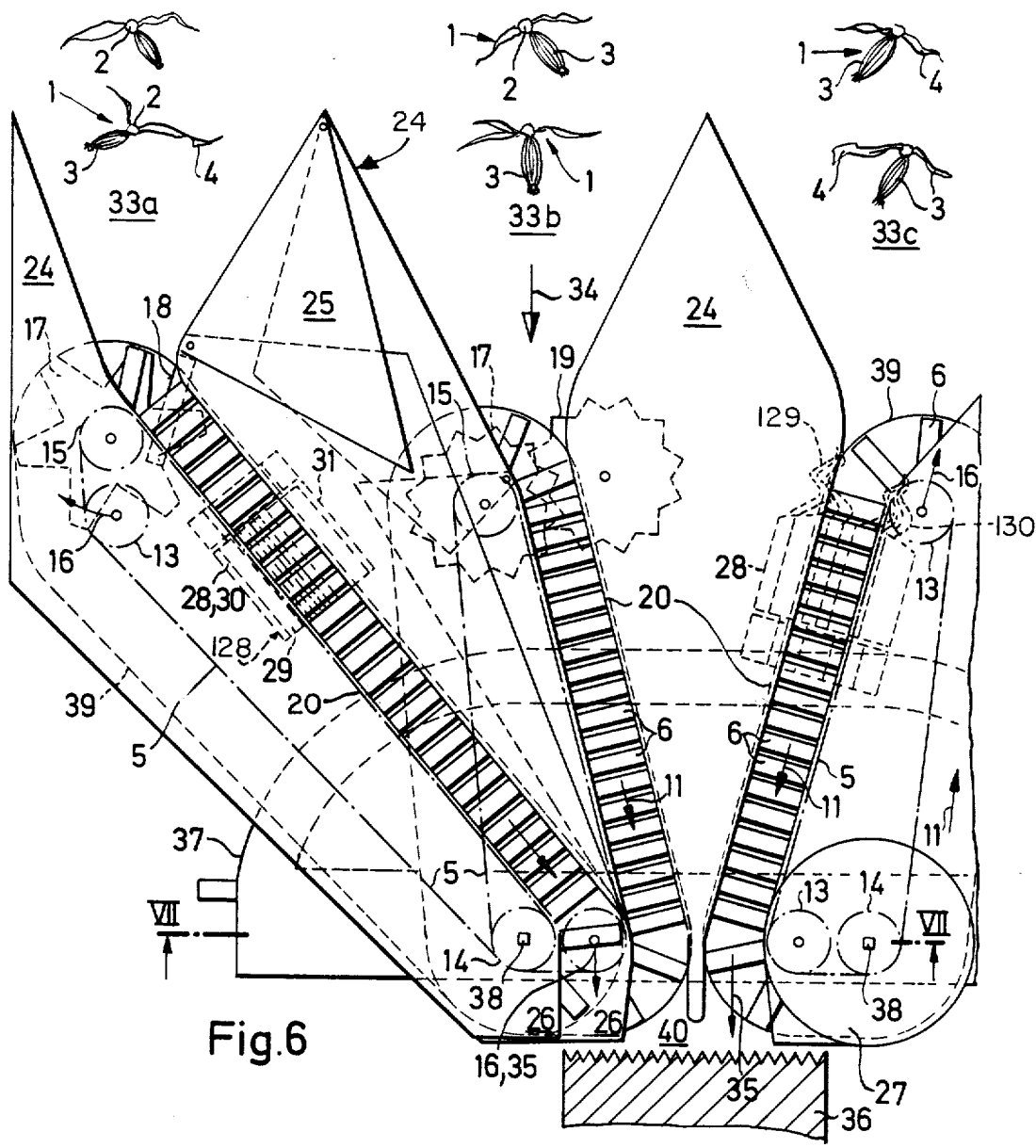

FIG. 6 is a top view of an inventive three-row corn harvester having a discharge zone, whereby row 33a is to be mowed, picked and the remainder is to be chopped and dropped on the ground, row 33b to be mowed, and row 33c is to be picked.

FIG. 6 illustrates furthermore the variable row receiving width between row 33a and row 33b, two kinds of mowers, two kinds of picking bases, two kinds of wiping-off methods, three types of chain tensioning constructions and a fastening construction of individual row receiving means on the central mounting block.

Figure 7:
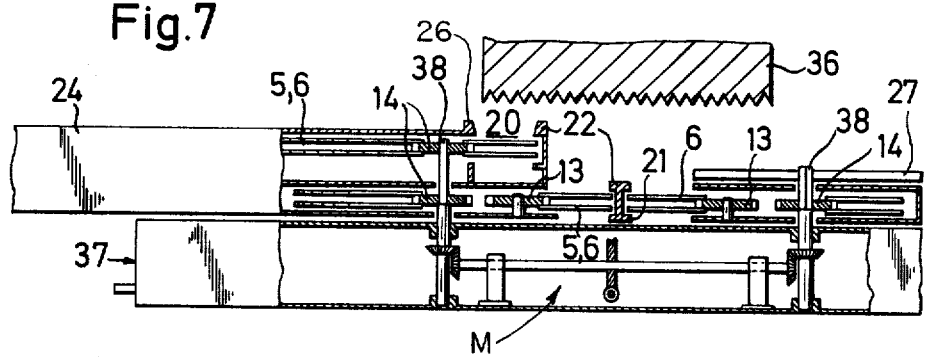

FIG. 7 is a cross-sectional view along the line VII in FIG. 6 to illustrate a drive and discharge place.

Figure 8:
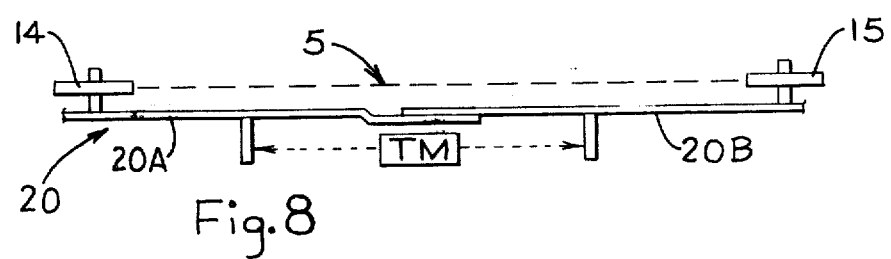

FIG. 8 diagrammatically discloses a chain tensioning arrangement.

The illustrations do not claim to be complete, but are only schematic illustrations in order to illustrate some inventive characteristics.

The corn plant 1 consists substantially of the corn stalk 2, the ear of corn 3 and the leaf 4. For the corn harvest, the special draw-in chain 5 with its many flanges 6 is used, the measurements of which are illustrated in FIG. 1 as: flange distance 6a, flange width 6b, flange length 6l and flange height 6h.

As is illustrated in FIG. 2, the flanges 6 can be constructed with a straight trailing edge 7, somewhat toothed trailing edge (such as a serrated trailing edge 8 or a rippled trailing edge 9) or a trailing edge equipped with resilient means 10. As to the latter, as shown in FIG. 2d, at least one flank or edge, preferably the trailing edge, of each flange 6 is cushioned by an elastic or resilient means preferably in the form of a rubber insert or a rubber support as indicated at 10. It is further contemplated that each third one of the flanges may be enclosed all around by such an elastic means. The running direction 11 of the draw-in chain 5 is indicated by arrows, other arrows show the infeed direction 34, namely how the corn stalks 2 are moved toward the opening draw-in chain, other arrows in turn indicate the movement of the stalks in the discharge direction 35.

Figure 3:
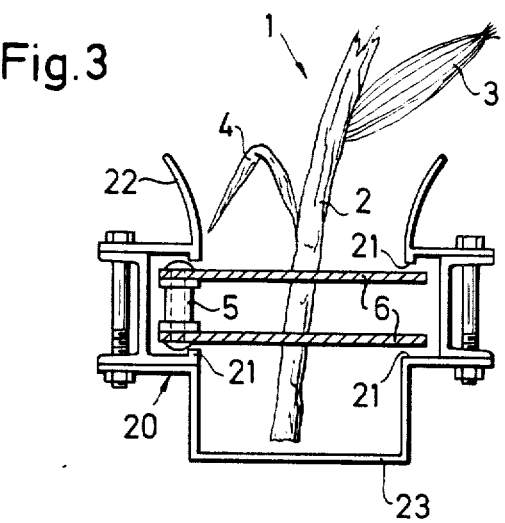
FIG. 3 is a cross-sectional view of a conveyor channel with a draw-in chain therein.
Figure 5:
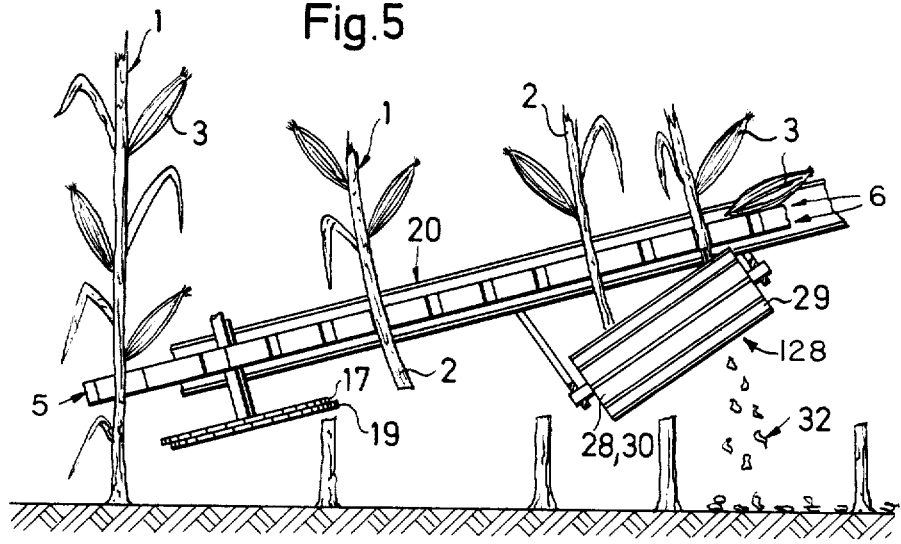
FIG. 5 is a schematic side view of an inventive picking device.
Figure 4:
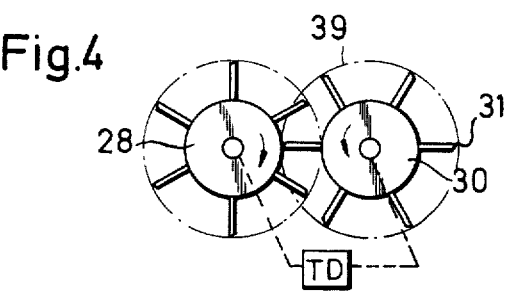
FIG. 4 is a cross-sectional view of a picking base, whereby a picking roller is constructed as a cutting roller.

The intention is first to envelop or clamp the corn stalk between the adjacent flanges 6 and thereafter to release same during the arcuate travel 12 of the draw-in chain at the discharge zone 40 (FIG. 6), due to the clear enlargement of the flange space (the space between adjacent flanges 6) which is formed from the relationship of the flange distance 6a, flange width 6b and flange height 6h during the arcuate travel portion (e.g. at 12 in FIGS. 2a–2d) of the chain. The enlargement of the flange space during the arcuate travel portion 12 of the chain toward the open side of the draw-in chain is not only used during a corn discharge operation, but also during gripping of the stalk 2 which takes place near the mower, if provided, after the corn has been supplied by row dividing members 24, 25 (FIG. 6). The working, or straight reach, of the draw-in chain 5 is supported, as illustrated in FIG. 3, by a conveyor channel 20 which has corn guiding plates 22 and guide rails 21 for the draw-in chain 5 and particularly for the free flange ends. A bottom plate 23 can thereby also be useful, particularly if corn stalks 2 are not tightly enough clamped by the flanges 6. However, the bottom plate should be removable as by loosening the illustrated bolts when the picking/cutting device 128, which is illustrated schematically in cross section in FIG. 4 and from the side in FIG. 5, is to be inserted. The picking-/cutting device 128 has picking rollers of which in FIG. 4 the right one 30 is constructed also as a cutting roller because its cutting edges 31 contact the member of the left picking roller 28, as is illustrated by the lines of movement 39 of the rotating edges. A tensioning device of any desired type, diagrammatically illustrated at TD in FIG. 4, may be provided for adjusting the distance between the rollers.

In FIG. 5, one can see how close the rear roller ends 29 of the picking/cutting device 128 come to the flanges and that the picking rollers 28, 30 form an angle with the draw-in chain 5 so that they grip the corn stalk, pull it through the flange spaces and distribute it as chopped corn 32 in direction of the ground while the ears of corn 3 remain above the flanges 6. The two cutting disks, or mowing blades, 17, 19 (FIGS. 5 and 6) contact one another on the outside to obtain a continuous scissorlike cut and to eliminate need for separately driving one such mowing blade through their lateral friction on one another.

More particularly, as seen in FIG. 6 in the center row 33b, the left rotating mowing blade 17 is driven by a mower drive 15 and itself drives the rotating counter blade 19 by frictional forces. The rotating mowing blade 17 for mowing of row 33a, however, cooperates with a stationary counter blade 18. For both rows 33a and 33b the corresponding mower drive 15 takes place through the corresponding draw-in chain 5. The draw-in chain is driven by a corresponding sprocket wheel 14 and is tensioned by a corresponding sprocket wheel 13 movable in the direction indicated by arrow 16 by any conventional means not shown.

Underneath the left draw-in chain 5 (FIG. 6) for receiving the row 33a, a picking base, or device, 128 as above described is mounted and has two picking/cutting rollers 28/30 with the cutting edges 31. The right draw-in chain for receiving the row 33c is supported by picking rollers 28 approximately of similar type, which catch the upright corn stalks by forwardly extending worms (indicated in broken lines at 129, 130) moving in opposite directions to move said corn stalks into the picking rollers, while the other picker through its angle formation relative to the draw-in chain course, directly grips the cut-off corn stalks with constantly closer moving picking or cutting edges 31. The central draw-in chain for receiving the row 33b will, with the draw-in chain 5 thereof and its many flanges 6, bring the mowed corn plant 1 to the discharge zone 40, as the two other draw-in chains move ears of corn 3 to where the oncoming harvested goods are urged out of the flange space by stationary wipers 26 or by a rotating wiper 27 during the arcuate travel of the chain about the corresponding sprocket wheels 13/14 and the harvested goods are thus transferred to the next following member of the corn harvesting machine, for example to a conveyor 36. The arrow 35 characterizes the discharge direction.

Row dividing members 24 also serve to connect the conveyor channels 20 and to cover the space therebetween. Such row dividing members can be exchanged or, as shown for example between rows 33a and 33b, have an adjustable structure with individual overlapping cover plates 25 in order to facilitate an adjustable row width. Such adjustment of row width is permitted by means of the special center mounting block 37 on which are secured the row dividing members 24 and from which project also the two drive shafts 38 which rotatably drive the sprocket wheels 14 and in turn are driven through transmission path M by any conventional motive power means, not shown. More particularly, the drive shafts 38 projecting upwardly from the mounting block define the pivot axes of the ones of the row receiving means pivotable for adjusting the harvester to different spacings of the rows 33a, 33b and 33c.

FIG. 7 illustrates in a cross-sectional view the installation of the center mounting block 37 having drive shafts 38 which drive the draw-in chains 5 over the sprocket wheels 14 and near the corn discharge zone 40 and in the conveyor channels 20. The conveyor channels contain corn guiding plates 22 and guide rails 21 for the flanges 6, and it is at the corn discharge zone 40 that the stationary wipers 26 or rotating wipers 27 are located so that the draw-in chains 5 can return again empty to again grip corn.

FIG. 8 indicates an alternative for tensioning of a chain 5 wherein the corresponding conveyor channel 20 comprises two telescoping parts 20A and 20B respectively associated with chain sprockets 14 and 15 and including suitable tension means TM for pressing the sprockets part.

I claim:

1. A corn harvester for harvesting of several rows of plants, comprising in combination:

plural row receiving means of adjustable lateral spacing, each said receiving means having an inlet opening toward a corresponding plant row for receiving plants thereof;

only one draw-in chain for each row receiving means, said chain having a straight reach extending and movable along the corresponding row receiving means, said draw-in chain comprising a plurality of adjacent plate-like flanges interconnected at one side of said draw-in chain and normally spaced from each other in said straight reach at a distance less than the diameter of a corn stalk for rendering a corn stalk therebetween longitudinally barely freely movable with respect to said straight reach in the space between said flanges, said chain including transverse means pivotally interconnecting adjacent first ends of adjacent plate-like flanges for permitting pivoting apart of two adjacent flanges in said straight reach by a stalk therebetween;

means tensioning said draw-in chain and cooperative with said pivotal interconnection of adjacent flange ends for resiliently permitting limited pivoting apart of two adjacent flanges against said chain tension due to a corn stalk therebetween in said reach, and wherein the corn stalk is normally lightly gripped between said adjacent flanges while still permitting the stalk to be pulled downwardly therethrough, said draw-in chain also having an arcuate input portion at the plant input end of said row receiving means and an arcuate output portion at the output end of said row receiving means, the space between flanges increasing at said arcuate input and output portions of said chain for free entry and exit of corn stalks between said adjacent flanges.

2. The corn harvester of claim 1, including means intermediate and below said straight reach for engaging and pulling stalks downwardly from between said flanges for causing said flanges to remove the ears from said stalks, wherein said spacing of said adjacent flanges in said straight reach remains less than required to permit an ear of corn to be pulled therethrough, said flanges cooperatively forming a conveyor deck for carrying rearwardly thereatop the thus removed corn ears.

3. The corn harvester of claim 2 in which the free width of each flange, laterally of the chain, is at least 3 times said space between adjacent flanges.

4. The corn harvester of claim 3 in which said flange free width is at least seven centimeters.

5. The corn harvester of claim 2 in which each flange has a rubber support on the trailing edge thereof.

6. The corn harvester according to claim 2 including an elastic means enclosing at least each third free flange.

7. The corn harvester of claim 2 in which said flanges have at least somewhat toothed trailing edges.

8. The corn harvester of claim 4 in which the draw-in chain incorporates a roller chain.

9. The corn harvester of claim 1 including fixedly supported input and output sprocket wheels at respective arcuate portions of said draw-in chain and at least a third sprocket wheel per draw-in chain defining said chain tensioning means, said output sprocket wheel being actuable for driving said draw-in chain and a rotary mowing blade co-shafted with and beneath said input sprocket wheel and rotatably driven therewith by said draw-in chain.

10. The corn harvester of claim 1 including a telescopical conveyor channel defining said chain tensioning means and for housing said straight reach, said channel having one part adjacent said chain input portion and another part adjacent said chain output portion and including sprocket wheels at both channel parts for carrying said chain, wherein pressing said channel parts apart tensions said chain.

11. The corn harvester of claim 1 in which said receiving means includes at least one guide rail for supporting the free ends of the flanges of the corresponding chain in said straight reach.

12. The corn harvester of claim 1 in which a said receiving means includes a conveyor channel in which said straight reach is disposed, said conveyor channel having longitudinal guide rails for said flanges and guiding plates for the corn to be conveyed on said flanges.

13. The corn harvester of claim 12 including a removable bottom plate disposed below and closing the bottom of the conveyor channel.

14. The corn harvester of claim 1 including a center mounting block on which the individual row receiving means are secured and including means extending upwardly from said center mounting block for driving said draw-in chains of said plural receiving means.

15. The corn harvester of claim 14 in which said upwardly extending means comprises drive shafts projecting from the top of said center mounting block and defining the fastening points and adjustment pivot axes of the individual row receiving means.

16. The corn harvester of claim 1 including a set of overlapping cover plates between an adjacent pair of individual row receiving means for covering the space therebetween while permitting adjustment of the distance therebetween for accommodating rows of differing lateral spacings.

17. The corn harvester of claim 1 including a discharge zone at the outlet of said receiving means and at least one wiper means closely vertically adjacent the corresponding draw-in chain for urging harvested goods from said draw-in chain and then for feeding said goods to a next following member of the harvesting machine.

18. The corn harvester of claim 17 in which said wiper means is a rotating wiper and including a sprocket wheel connected thereto through a common shaft, said sprocket wheel being one at least two sprocket wheels carrying the corresponding draw-in chain.

19. The corn harvester of claim 1 including, intermediate the ends of ones of said receiving means, picking means for picking of ears of corn and mowing means for mowing the corn plants.

20. The corn harvester of claim 1 including a picking base comprising at least two picking rollers, which picking base can be rapidly located at and removed from a position below and intermediate the ends of a selected draw-in chain for engaging corn stalks depending from the chain flanges, and including means for securing said picking base in said position.

21. The corn harvester of claim 20 in which the rear ends of said two picking rollers extend closer to the draw-in chain flanges than do the front ends thereof, so as to progressively pull downwardly through the flanges the mowed corn plants.

22. The corn harvester of claim 21 in which at least one said picking roller is a cutting roller having cutting edges which contact the central body of the oppositely positioned roller for chopping the intervening corn stalk for deposit on the ground.

23. The corn harvester of claim 22 including a tensioning device for adjusting the distance between said two rollers.

24. The corn harvester of claim 23 in which said cutting roller has at least five cutting edges.

25. The corn harvester of claim 1 including a rotating mower blade below said draw-in chain, and adjacent said receiving means inlet, a counter blade coactive therewith for severing corn stalks presented to said receiving means, and including a sprocket which carries said draw-in chain and further including a shaft carrying both said rotating mower blade and said sprocket, whereby the draw-in chain directly drives the mower blade.

26. The corn harvester of claim 25 in which said counter blade is a further rotatable mower blade and laterally contacts the driven mower blade for being rotated thereby.

27. The corn harvester of claim 26 in which said two mower blades are of equal size and have peripheral cutting edges which coact for mowing corn plants.

* * * * *